US011773276B2

(12) United States Patent
Miyamoto

(10) Patent No.: US 11,773,276 B2
(45) Date of Patent: Oct. 3, 2023

(54) CONDUCTIVE POLYMER COMPOSITION

(71) Applicant: SOKEN CHEMICAL & ENGINEERING Co., Ltd., Tokyo (JP)

(72) Inventor: Takeshi Miyamoto, Sayama (JP)

(73) Assignee: SOKEN CHEMICAL & ENGINEERING CO., LTD., Tokyo (JP)

(*) Notice: Subject to any disclaimer, the term of this patent is extended or adjusted under 35 U.S.C. 154(b) by 247 days.

(21) Appl. No.: 17/296,322

(22) PCT Filed: Dec. 13, 2019

(86) PCT No.: PCT/JP2019/048994
§ 371 (c)(1),
(2) Date: Dec. 7, 2021

(87) PCT Pub. No.: WO2020/129854
PCT Pub. Date: Jun. 25, 2020

(65) Prior Publication Data
US 2022/0220321 A1    Jul. 14, 2022

(30) Foreign Application Priority Data
Dec. 19, 2018 (JP) ................. 2018-236954

(51) Int. Cl.
C09D 5/24        (2006.01)
C09D 7/20        (2018.01)
C09D 7/63        (2018.01)
C08G 61/12       (2006.01)
C08K 5/41        (2006.01)
C09D 165/00      (2006.01)

(52) U.S. Cl.
CPC ............. *C09D 5/24* (2013.01); *C08G 61/126* (2013.01); *C08K 5/41* (2013.01); *C09D 7/20* (2018.01); *C09D 7/63* (2018.01); *C09D 165/00* (2013.01); *C08G 2261/11* (2013.01); *C08G 2261/124* (2013.01); *C08G 2261/3243* (2013.01); *C08G 2261/514* (2013.01)

(58) Field of Classification Search
CPC .............. C08G 16/00; C08G 2261/11; C08G 2261/124; C08G 2261/1424; C08G 2261/148; C08G 2261/3223; C08G 2261/3243; C08G 2261/33; C08G 2261/40; C08G 2261/51; C08G 2261/514; C08G 2261/792; C08G 61/126; C08L 65/00; C08K 5/41; C09D 165/00; C09D 5/24; C09D 7/20; C09D 7/63; H01B 1/12
See application file for complete search history.

(56) References Cited

U.S. PATENT DOCUMENTS 4,711,946 A    12/1987 Jenekhe et al.
4,781,443 A    11/1988 Giles 2013/0229750 A1    9/2013  Nobuta et al.
2015/0322308 A1    11/2015 Echigo et al.
2015/0348671 A1    12/2015 Fujiki et al.
2016/0130384 A1    5/2016  Higashihara et al.
2020/0118766 A1    4/2020  Miyamoto et al.

FOREIGN PATENT DOCUMENTS

| CN | 105111416 A   |   | 12/2015 |
|----|---------------|---|---------|
| CN | 105566861 A   |   | 5/2016  |
| CN | 105733260 A   |   | 7/2016  |
| CN | 108841097 A   |   | 11/2018 |
| EP | 0260541 A2    |   | 3/1988  |
| EP | 2865695 A1    |   | 4/2015  |
| EP | 3012275 A1    |   | 4/2016  |
| GB | 1404829 A     |   | 9/1975  |
| JP | 2003-330145 A |   | 11/2003 |
| JP | 2003330145 A  | * | 11/2003 |
| JP | 2004-109586 A |   | 4/2004  |
| JP | 2013-171956 A |   | 9/2013  |
| JP | 2015-177131 A |   | 10/2015 |
| JP | 2015-221873 A |   | 12/2015 |
| JP | 2018-022727 A |   | 2/2018  |
| JP | 2019-172770 A |   | 10/2019 |
| WO | 8700678 A1    |   | 1/1987  |
| WO | 2013047293 A1 |   | 4/2013  |
| WO | 2016/111277 A1|   | 7/2016  |
| WO | 2018/221438 A1|   | 12/2018 |

OTHER PUBLICATIONS

Office Action dated Nov. 30, 2022, in corresponding Chinese Application No. 201980062654.8, 12 pages.
Request for the Submission of an Opinion dated Jul. 7, 2022 in connection with corresponding KR application No. 10-2021-7015868 (11).
International Search Report dated Mar. 3, 2020 in corresponding International Application No. PCT/JP2019/048994; 6 pages.
Chen et al., "Small-Bandgap Conducting Polymers Based on Conjugated Poly(heteroarylene methines). 1. Precursor Poly(heteroarylene methylenes)"; Macromolecules; Jan. 16, 1995; vol. 28, No. 2, pp. 454-464.
Chen et al., "Small-Bandgap Conducting Polymers Based on Conjugated Poly(heteroarylene methines). 2. Synthesis, Structure and Properties"; Macromolecules; Jan. 16, 1995; vol. 28, No. 2, pp. 465-480.
Tsai et al., "Synthesis and Properties of New Small Band Gap Conjugated Polymers: Methine Bridged Poly(3,4-ethlenedioxypyrrole)"; Polymer Journal; 2009; vol. 40, No. 5, pp. 363-369.

(Continued)

*Primary Examiner* — Mark Kopec
*Assistant Examiner* — Jaison P Thomas
(74) *Attorney, Agent, or Firm* — Maier & Maier, PLLC

(57) ABSTRACT

A conductive polymer composition having the resistance to moisture and heat in the coating film is provided. A conductive polymer composition comprising a solvent and a π-conjugated conductive polymer is provided. A vinyl sulfone group-containing compound containing a vinyl sulfone group as a dopant of the conductive polymer or an additive is included and when the conductive polymer composition contains the vinyl sulfone group-containing compound as the additive, the vinyl sulfone group-containing compound contains a plurality of vinyl sulfone groups.

5 Claims, No Drawings

(56) References Cited

OTHER PUBLICATIONS

Kiebooms et al., "Synthesis and Characterisation of Poly(isothianaphthene methine)", Synthetic Metals, 1999, pp. 40-43.
Kiebooms et al., "Synthesis of a New Class of Low-Band-Gap Polymers with Liquid Crystalline Substituents"; Macromolecules; 2001; vol. 34, pp. 7989-7998.
Chen et al., "Theoretical and Experimental Characterization of Small Band Gap Poly(3,4-ethylenedioxythiophene methine)s"; Macromolecules; 2004; vol. 37, pp. 5959-5964.
Zaman et al., "A new simple synthesis of poly(thiophene-methine)s"; Chemical Communications; 2005; vol. 33, pp. 4187-4189.
Extended European Search Report dated Feb. 16, 2022 in corresponding European Patent No. 19900475.5; 16 pages.

\* cited by examiner

CONDUCTIVE POLYMER COMPOSITION

TECHNICAL FIELD

The present invention relates to a conductive polymer composition.

BACKGROUND FIELD

One of the applications of conductive polymers is a solid electrolyte in a capacitor. There is a need for the solid electrolyte that can be used in harsher environments, and that have higher reliability under high heat and high humidity conditions.

Patent Literature 1 discloses a capacitor that uses PEDOT/PSS film as a solid electrolyte.

CITATION LIST

Patent Literature

Patent literature 1: JP2018-22727A

SUMMARY OF INVENTION

Technical Problem

However, since the structures of conductive polymers such as PEDOT/PSS change under high heat and high humidity conditions, there were problems such as a decrease in conductivity and a change of state such as peeling of the coating film from the substrate and cracking of the coating film.

The present invention has been made in view of such circumstances and provides a conductive polymer composition, the coating film of which has excellent moisture and heat resistance.

Solution to Problem

According to the present invention, a conductive polymer composition comprising a solvent and a π-conjugated conductive polymer
wherein:
a vinyl sulfone group-containing compound containing a vinyl sulfone group is included as a dopant of the conductive polymer or an additive; and
when the conductive polymer composition contains the vinyl sulfone group-containing compound as the additive, the vinyl sulfone group-containing compound contains a plurality of vinyl sulfone groups is provided.

The inventors have conducted an intensive study to improve the moisture and heat resistance in the coating film and have found that the moisture and heat resistance in the coating film could be improved by including a vinyl sulfone group-containing compound as a dopant of the conductive polymer or as an additive in the conductive polymer composition and have completed the present invention.

MODE FOR CARRYING OUT THE INVENTION

The embodiments of the present invention will be described in detail below.

1. Conductive Polymer Composition

The conductive polymer composition of one embodiment of the present invention comprises a solvent and a π-conjugated conductive polymer. Each component is described in detail below.

1-1. Vinyl Sulfone Group-Containing Compound

The conductive polymer composition according to this embodiment is characterized in that it includes a vinyl sulfone group-containing compound containing a vinyl sulfone group as a dopant of the conductive polymer or an additive.

The vinyl sulfone group is a functional group represented by the chemical formula (4).

(4)

Since the vinyl group in the vinyl sulfone group is not highly reactive, little or no crosslinking reaction proceeds at a temperature below the crosslinking start temperature. For this reason, the conductive polymer composition according to this embodiment has excellent storage stability. The crosslinking start temperature is, for example, 140° C.

When the vinyl group in the vinyl sulfone group is heated to equal to or higher than the crosslinking start temperature, a crosslinking reaction proceeds by thermal radical polymerization. The crosslinking reaction forms a network structure and stabilizes the coating film, thus improving the moisture and heat resistance in the coating film.

In addition, since the vinyl sulfone group has high hydrophilicity, it is easily mixed with the conductive polymer. Therefore, when the conductive polymer composition according to this embodiment is used to form a solid electrolyte of a capacitor, the capacitance appearance rate is likely to be high.

When the vinyl sulfone group-containing compound is included as a dopant of the conductive polymer, the vinyl sulfone group-containing compound is preferably a monovalent acid having a vinyl sulfone group, such as vinyl sulfonic acid, or an alkali metal salt thereof. Since the vinyl sulfone group-containing compound is tightly bound to the π-conjugated polymer as a dopant, even if the number of vinyl groups in the vinyl sulfone group-containing compound is one, a network structure can be formed by the crosslinking reaction.

On the other hand, when the vinyl sulfone group-containing compound is included as an additive, the vinyl sulfone group-containing compound must contain a plurality of vinyl sulfone groups. In this case, the conductive polymer is trapped in the network structure formed by the vinyl sulfone group-containing compound, thereby the coating film is stabilized. The vinyl sulfone group-containing compound is more preferably a compound represented by general formula (3).

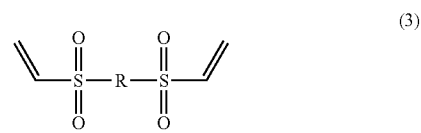

(3)

In the general formula (3), R is an atom or an atomic group. The main chain of R is composed of one or more atoms selected from a carbon atom, a nitrogen atom, an oxygen atom, and a sulfur atom, preferably composed of one or more atoms selected from a carbon atom, a nitrogen atom, and an oxygen atom, even more preferably composed of one or more atoms selected from a carbon atom and a nitrogen atom, and even more preferably composed of a carbon atom.

The number of atoms in the main chain of R is, for example, from 1 to 20, preferably from 1 to 10, specifically, 1, 2, 3, 4, 5, 6, 7, 8, 9, 10, 11, 12, 13, 14, 15, 16, 17, 18, 19, 20, and may be in the range between the two values exemplified herein.

The side chain of R is composed of the atoms exemplified for the main chain of R or a hydrogen atom.

The molecular weight of R is preferably between 12 and 1000, specifically, for example, 12, 50, 100, 150, 200, 250, 300, 350, 400, 450, 500, 600, 700, 800, 900, 1000, and may be in the range between the two values exemplified herein.

R preferably has no vinyl groups other than vinyl sulfone groups. This is because the presence of a vinyl group other than vinyl sulfone groups may result in poor storage stability.

Specific examples of R have the following structure.
(a) An alkylene group
(B) An atomic group having a structure in which amide groups (preferably, the nitrogen atoms of the amide groups) are bonded to both ends of an alkylene group
(C) An atomic group having a structure in which other alkylene groups are bonded to the amide groups at both ends of the atomic group of structure (b)

R can be an atomic group in which another atom or atomic group is bonded to one end or both ends in structures (a) to (c), or each of both ends in structures (a) to (c) is bonded to a sulfur atom of a vinyl sulfone group.

Specific examples of the vinyl sulfone group-containing compounds represented by the general formula (3) include N,N'-ethylenebis [2-(vinyl sulfonyl)acetamide], N,N'-trimethylene bis[2-(vinyl sulfonyl)acetamide], bis(vinyl sulfonyl)methane, 1,2-bis(vinyl sulfonyl)ethane, and 1,4-bis(vinyl sulfonyl)butane.

1-2. Solvent

The solvent is not particularly limited as long as it can dissolve or disperse the conductive polymer, and it preferably includes an organic solvent. Since the solvent must remain when crosslinking the vinyl groups of the vinyl sulfone group-containing compound, the solvent preferably contains a high boiling point solvent having a boiling point equal to or higher than the crosslinking start temperature (for example, 140° C.). The proportion of the high boiling point solvent in the solvent is preferably 50% or more by volume, may be, for example, 50, 60, 70, 80, 90, or 100% by volume, and may be in the range between the two values exemplified herein.

Examples of the high boiling point solvent include propylene carbonate (carbonates), gamma-butyrolactone, propylene glycol, dipropylene glycol, ethylene glycol, diethylene glycol, butyl carbitol, and propylene glycol monomethyl ether acetate.

The solvent may include only the high boiling point solvent, but may also include another solvent, for example, an alcohol solvent such as methanol, ethanol, isopropyl alcohol, and butanol, a ketone solvent such as acetone, methyl ethyl ketone, and methyl isobutyl ketone, a lactic acid solvent such as methyl lactate and ethyl lactate.

The non-volatile content obtained by removing the solvent from the conductive polymer composition is not particularly limited, and is, for example, 0.1% to 20.0% by mass. Specifically, it is 0.1, 0.5, 1.0, 1.5, 2.0, 2.5, 3.0, 5.0, 10.0, 15.0, 20.0% by mass and may be within the range between any two of the numerical values exemplified here.

The solvent may include water in addition to the above organic solvent, and, from the viewpoint of substrate adhesion, the proportion of water with respect to the total solvent is preferably 50% or less, more preferably 10% or less.

1-2. π-Conjugated Conductive Polymer

The π-conjugated conductive polymer of the present invention is composed of a π-conjugated polymer doped with a dopant.

Examples of the π-conjugated polymer include any polymer having a r-conjugated system, for example, a polymer containing a skeleton of aniline, pyrrole, thiophene, or a derivative thereof, and a polymer containing a skeleton of thiophene or a derivative thereof. In the above case, in the doped state and the undoped state, the stability against environmental conditions, other than humidity, such as temperature and oxygen is excellent.

Examples of the dopant can include any compound that can impart conductivity to the π-conjugated polymer, a polymer dopant, and a low molecular weight dopant. Examples of the polymer dopant include a polyvalent acid such as polystyrene sulfonic acid (PSS). As the polymer dopant, one that receives electrons from the π-conjugated polymer and becomes polyanion is preferred. Examples of the low molecular weight dopant include a monovalent acid such as vinyl sulfonic acid, p-toluenesulfonic acid, 2-naphthalene sulfonic acid, 1-naphthalene sulfonic acid, dodecyl sulfonic acid, dodecylbenzene sulfonic acid, di(2-ethylhexyl) sulfosuccinic acid, tetrafluoroboric acid, trifluoroacetic acid, hexafluorophosphoric acid, trifluoromethanesulfonimide, and their alkali metal salts.

As the low molecular weight dopant, one that receives an electron from the r-conjugated polymer and becomes monoanion is preferred, and a monoanion having a sulfo group is preferred, and a monoanion having a structure in which an alkyl chain and a sulfo group are bonded is even more preferred. It is preferable to use a dopant that becomes a monoanion because the conductivity of the conductive polymer is easily improved when a dopant that becomes a monoanion is used.

When the vinyl sulfone group-containing compound is not included as an additive, the vinyl sulfone group-containing compound must be included as a dopant. In this case, a compound other than the vinyl sulfone group-containing compound may be included as a dopant. The ratio of the vinyl sulfone group-containing compound to the total dopant is preferably 50 mol % or more by, specifically, for example, 50, 60, 70, 80, 90, or 100 mol %, and may be in the range between the two values exemplified herein. When this ratio is too small, crosslinking by vinyl groups may not be sufficiently carried out, resulting in insufficient improvement of the moisture and heat resistance in the coating film.

When the vinyl sulfone group-containing compound is included as an additive, the vinyl sulfone group-containing compound may or may not be included as a dopant.

The conductive polymer preferably has at least one of the structural units represented by the following general formula (1) or the following general formula (2). Since the π-conjugated polymer contained in this conductive polymer has $R^1$, its dispersibility in a solvent is enhanced.

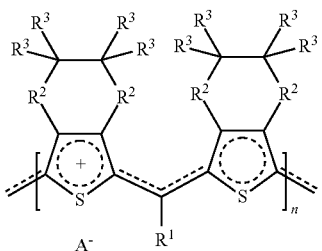

(1)

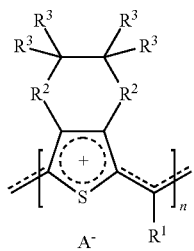

(2)

In the general formulas (1) and (2), $R^1$ is an alkyl group having 1 to 12 carbon atoms, an alkoxy group having 1 to 12 carbon atoms, an alkylene oxide group having 1 to 12 carbon atoms, an aromatic group, or a heterocyclic group, each of which optionally has a substituent Each of $R^2$ is an oxygen atom or a sulfur atom, and each of $R^3$ is a hydrogen atom, or an alkyl group having 1 to 12 carbon atoms, an alkoxy group having 1 to 12 carbon atoms, an alkylene oxide group having 1 to 12 carbon atoms, an aromatic group, or a heterocyclic group, each of which optionally has a substituent. $A^-$ is a monoanion derived from a dopant. n is 2 to 300.

The alkyl group having 1 to 12 carbon atoms may be linear, branched, or cyclic, and may have, for example, 1 to 8 carbon atoms, 1 to 6 carbon atoms, or 1 to 4 carbon atoms. Specific examples of the alkyl group having 1 to 12 carbon atoms include methyl group, ethyl group, n-propyl group, isopropyl group, n-butyl group, t-butyl group, cyclopentyl group, cyclohexyl group, bornyl group, isobornyl group, dicyclopentanyl group, and adamantyl group.

The alkoxy group having 1 to 12 carbon atoms may be linear, branched, or cyclic, and may have, for example, 1 to 8 carbon atoms, 1 to 6 carbon atoms, or 1 to 4 carbon atoms.

The alkylene oxide group having 1 to 12 carbon atoms may have 1 to 8 carbon atoms, 1 to 6 carbon atoms, or 1 to 4 carbon atoms.

Examples of the aromatic group may include phenyl group, benzyl group, and various condensed ring groups. Examples of the condensed ring group may include naphthalene ring, azulene ring, anthracene ring, phenanthrene ring, pyrene ring, chrysene ring, naphthacene ring, triphenylene ring, acenaphthene ring, coronene ring, fluorene ring, fluoranthrene ring, pentacene ring, perylene ring, pentaphene ring, picene ring, and pyranthrene ring.

Examples of the heterocyclic group may include silole ring, furan ring, thiophene ring, oxazole ring, pyrrole ring, pyridine ring, pyridazine ring, pyrimidine ring, pyrazine ring, triazine ring, oxadiazole ring, triazole ring, imidazole ring, pyrazole ring, thiazole ring, indole ring, benzimidazole ring, benzthiazole ring, benzoxazole ring, quinoxaline ring, quinazoline ring, phthalazine ring, thienothiophene ring, carbazole ring, azacarbazole ring (which represents that any one or more of the carbon atoms constituting the carbazole ring is replaced by a nitrogen atom), dibenzosilole ring, dibenzofuran ring, dibenzothiophene ring, a ring in which any one or more of carbon atoms constituting benzothiophene ring or dibenzofuran ring is replaced by a nitrogen atom, benzodifuran ring, benzodithiophene ring, acridine ring, benzoquinoline ring, phenazine ring, phenanthridine ring, phenanthroline ring, cyclazine ring, kindrin ring, tepenidine ring, quinindrine ring, triphenodithiazine ring, triphenodioxazine ring, phenanthrazine ring, anthrazine ring, perimidine ring, naphthofuran ring, naphtho thiophene ring, naphthodifuran ring, naphthodithiophene ring, anthrafuran ring, anthradifuran ring, anthrathiophene ring, anthradithiophene ring, thianthrene ring, phenoxathiin ring, dibenzocarbazole ring, indolocarbazole ring, dithienobenzene ring, epoxy ring, aziridine ring, thiirane ring, oxetane ring, azetidine ring, thietane ring, tetrahydrofuran ring, dioxolane ring, pyrrolidine ring, pyrazolidine ring, imidazolidine ring, oxazolidine ring, tetrahydrothiophene ring, sulfolane ring, thiazolidine ring, ε-caprolactone ring, ε-caprolactam ring, piperidine ring, hexahydropyridazine ring, hexahydropyrimidine ring, piperazine ring, morpholine ring, tetrahydropyran ring, 1,3-dioxane ring, 1,4-dioxane ring, trioxane ring, tetrahydrothiopyran ring, thiomorpholine ring, thiomorpholine-1,1-dioxide ring, pyranose ring, diazabicyclo [2,2,2]-octane ring, phenoxazine ring, phenothiazi ring, okisantoren ring, thioxanthene ring, a monovalent group derived from phenoxathiin ring.

Examples of the substituent, which $R^1$ and $R^3$ may optionally have, include an alkyl group having 1 to 12 carbon atoms, an alkoxy group having 1 to 12 carbon atoms, an alkylene oxide group having 1 to 12 carbon atoms, an aromatic group, a hydroxyl group, a carboxyl group, a halogen such as fluorine, chlorine, bromine, iodine, an aldehyde group, an amino group, a cycloalkyl group having 3 to 8 carbon atoms. A hydroxy group and a carboxyl group are preferable.

The number of structural units (1) and (2) which the conductive polymer has is not particularly limited and is preferably 2 to 300. Specifically, it may be, for example, 2, 5, 10, 20, 30, 40, 50, 60, 70, 80, 90, 100, 200, or 300, and may be within a range between any two of the numerical values exemplified here.

The content ratio of the structural units (1) and (2) contained in the conductive polymer can be adjusted by the ratio of the amount of thiophene derivative represented by general formula (5) and aldehyde added. The molar ratio of thiophene derivative to aldehyde added, thiophene derivative/aldehyde, is, for example, 1/1, 2/1, 3/1, 4/1, and 5/1 and may be in the range between the two values exemplified herein. From the viewpoint of the balance between solubility and conductivity, the molar ratio is preferably 1/1 to 4/1 and more preferably 1/1 to 2/1.

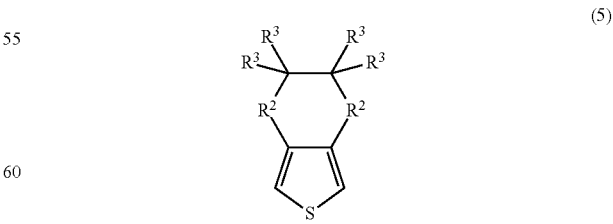

(5)

The method of synthesizing the conductive polymer is not particularly limited. For example, it can be obtained by adding a dopant and an oxidizing agent to a thiophene derivative and aldehyde, and heating and stirring them in a solvent under an inert gas atmosphere to polymerize. Further, a decomposition accelerator of an oxidizing agent may be added.

The molar ratio of the dopant to the thiophene derivative, dopant/thiophene derivative, is, for example, 0.01 to 0.5, preferably 0.1 to 0.5. Specifically, the molar ratio is, for example, 0.01, 0.05, 0.1, 0.2, 0.3, 0.4, 0.5, and may be in the range between the two values exemplified herein. When this molar ratio is too small, the conductivity of the conductive polymer may become too low, and especially, when the dopant is a vinyl sulfone group-containing compound, the network structure is not sufficiently formed by crosslinking, leading to insufficient moisture and heat resistance in the coating film.

The oxidant is not particularly limited as long as it can proceed the polymerization reactions and Examples of the oxidant may include ammonium peroxodisulfate, potassium peroxodisulfate, sodium peroxodisulfate, iron chloride (III), iron sulfate (III), iron hydroxide. (III), iron tetrafluoroborate (III), hexafluorophosphoric acid iron (III), copper sulfate (II), copper chloride (II), copper tetrafluoroborate (II), hexafluorophosphoric acid copper (II), and organic peroxide such as ammonium oxodisulfate, benzoyl peroxide and lauroyl peroxideand.

The solvent is not particularly limited as long as the reaction between the heterocyclic compound and the aldehyde derivative proceeds. Example of the solvent may include gamma-butyrolactone, propylene carbonate, ethylene carbonate, acetonitrile, tert-butyl methyl ether, ethyl acetate, benzene, heptane, water, an alcohol solvent such as methanol, ethanol, isopropyl alcohol, butanol, and a ketone solvent such as acetone, methyl ethyl ketone, methyl isobutyl ketone, and a glycol solvent such as methyl cellosolve, ethyl cellosolve, propylene glycol methyl ether, propylene glycol ethyl ether, and a lactic acid solvent such as methyl lactate and ethyl lactate. From the viewpoint of the efficiency of the oxidizing agent, an aprotic solvent is preferable.

1-3. Additive

<Vinyl Sulfone Group-Containing Compound>

When the dopant of the conductive polymer is not a vinyl sulfone group-containing compound, a vinyl sulfone group-containing compound is added as an additive. The vinyl sulfone group-containing compound is preferably a compound containing a plurality of vinyl sulfone groups. In this case, a network structure formed by the reaction between the vinyl sulfone group-containing compounds stabilizes the coating film. The ratio of the additive to the total non-volatile content of the conductive polymer composition is preferably 1 to 30% by mass, more preferably 3 to 20% by mass. Specifically, the ratio of the additive is, for example, 1, 2, 3, 4, 5, 6, 7, 8, 9, 10, 15, 20, 25, 30% by mass, and may be in the range between the two values exemplified herein. When this ratio is too small, the moisture and heat resistance in the coating film may not be sufficiently improved, and when this ratio is too large, the conductivity may become low.

<Polyfunctional Thiol>

The conductive polymer composition preferably contains a polyfunctional thiol. A polyfunctional thiol is a compound having a plurality of thiol groups. Since the vinyl group of the vinyl sulfone group is not highly reactive, the crosslinking reaction may not proceed sufficiently even when heated. The thiol group functions as a Michael addition nucleophile to the vinyl group of the vinyl sulfone group. Therefore, the addition reaction of each of the thiol groups of the polyfunctional thiol with separate vinyl groups promotes the crosslinking reaction.

Example of the polyfunctional thiol includes a bifunctional thiol such as tetraethylene glycol bis (3-mercaptopropionate), a trifunctional thiol such as tris-[(3-mercaptopropionyloxy)-ethyl]-isocyanurate, and trimethylolpropane tris (3-mercaptopropionate), a tetrafunctional thiol such as 1,3,4,6-tetrakis (2-mercaptoethyl) glycoluryl, and pentaerythritol tetrakis (3-mercaptopropionate), a hexafunctional thiol such as dipentaerythritol hexakis (3-mercaptopropionate).

The polyfunctional thiol is preferably added so that the molar ratio of the thiol group to the vinyl group, thiol group/vinyl group, is 0.1 to 10. This molar ratio is preferably 0.3 to 3, and specifically, for example, 0.1, 0.2, 0.3, 0.4, 0.5, 0.6, 0.7, 0.8, 0.9, 1.0, 2, 3, 4, 5, 6, 7, 8, 9, and 10, and may be in the range between the two values exemplified herein. when this molar ratio is too small, the crosslinking reaction may not proceed sufficiently. When this molar ratio is too large, the conductivity of the conductive polymer may become low.

<Basic Compound>

The conductive polymer composition preferably does not contain a basic compound such as an amine compound. This is because basic compounds are easy to react with vinyl groups, and the addition of basic compounds reduces storage stability. Examples of amine compounds include a primary amine, a secondary amine, a tertiary amine, an aromatic amine, and a heterocyclic amine.

The addition of the basic compound is permitted as long as it does not have a serious effect on storage stability, but in that case, the molar ratio of the basic group of the basic compound to the vinyl group, basic group/vinyl group is preferably 0.3 or less, and more preferably 0.1 or less.

<Vinyl Compound Other than Vinyl Sulfone Group-Containing Compound>

The conductive polymer composition preferably does not contain a vinyl compound other than a vinyl sulfone group-containing compound ("the other vinyl compound"). This is because the polymerization reaction of the other vinyl compound proceeds at a relatively low temperature, and the addition of the other vinyl compound reduces the storage stability.

Examples of the other vinyl compounds include a monofunctional vinyl compound having one vinyl group and a polyfunctional vinyl compound having a plurality of vinyl groups. In the latter case, since the crosslinking reaction is more likely to proceed due to the plurality of vinyl groups, the adverse effect on storage stability is more remarkable.

The molar ratio of the vinyl group of the other vinyl compound to the vinyl group of the vinyl sulfone group-containing compound (the other vinyl compound/vinyl sulfone group-containing compound) is preferably 0.3 or less, and more preferably 0.1 or less.

2. Method for Manufacturing Conductive Polymer Thin Film

The method for manufacturing a conductive polymer thin film according to an embodiment of the present invention comprises a thin film forming step.

In the thin film forming step, the conductive polymer composition described in "1. Conductive polymer composition" is applied onto a substrate and then heat-treated, thereby crosslinking the vinyl groups of the vinyl sulfone groups and removing the solvent to form a thin film.

The substrate is not particularly limited, and a substrate used for a capacitor is preferable. This is because reliability under high heat and high humidity conditions is required for capacitor applications.

The substrate may include, for example, a material containing aluminum, tantalum, niobium, and an alloy thereof.

A dielectric layer may be formed on the surface of the substrate. The dielectric layer can be formed, for example, by oxidizing the surface. The method for oxidizing the surface of the substrate is not particularly limited, and for example, may include anodizing by applying a voltage for about 5 to 90 minutes in an aqueous solution containing a weak acid such as phosphoric acid or adipic acid.

By forming the conductive polymer thin film through the dielectric layer formed on the surface of the substrate, an anode body of a solid electrolytic capacitor can be formed. Further, the solid electrolytic capacitor can be manufactured by using this anode body.

The method of coating is not limited and may include dropping the conductive polymer composition onto the substrate and impregnating the substrate with the conductive polymer composition.

The heat treatment can be performed at a temperature equal to or higher than the crosslinking start temperature of the vinyl group of the vinyl sulfone group. This can initiate thermal radical polymerization and promote the crosslinking reaction. The temperature of the heat treatment is 140 to 250° C., preferably 140 to 180° C. The temperature of the heat treatment is specifically, for example, 140, 150, 160, 170, 180, 190, 200, 210, 220, 230, 240, 250° C. and may be in the range between any two of the numerical values exemplified here. When this temperature is too low, crosslinking does not proceed sufficiently. When this temperature is too high, deterioration of the coating film is likely to occur.

The heat treatment time is, for example, 10 to 120 minutes, specifically, 10, 20, 30, 40, 50, 60, 70, 80, 90, 100, 110, 120 minutes, and may be in the range between the two values exemplified herein. When this time is too short, crosslinking does not proceed sufficiently. When this time is too long, deterioration of the coating film and reduction of productivity are likely to occur.

EXAMPLES

1. Manufacture of Dispersions

Production Example 1 (General Formula (1)+Vinyl Sulfonic Acid)

To a 1 L flask, 250 g of propylene carbonate, 1.7 g of 3,4-ethylenedioxythiophene (EDOT), and 0.65 g of VSA-S (vinyl sulfonic acid, manufactured by ASAHI KASEI FINE-CHEM CO., LTD.) were added, and the mixture was stirred for 0.5 hours. Next, under nitrogen purge, 0.02 g of iron (III) trisparatoluenesulfonate ($Fe(PTS)_3$), 0.9 g of OFBA (phthalaldehyde acid), 4.5 g of benzoyl peroxide (purity 75% by mass, manufactured by NOF CORPORATION) were added, and the mixture was stirred at 40° C. for 4 hours and at 60° C. for 2 hours. After adding 50 g of propylene carbonate to adjust the non-volatile content, the solution was treated with an ultrasonic homogenizer to obtain a propylene carbonate dispersion A of a conductive polymer with a non-volatile content of 1.0% by mass.

Production Example 2 (General Formula (1)+Naphthalene Sulfonic Acid)

A propylene carbonate dispersion B of conductive polymer with a non-volatile content of 1.0% by mass was obtained by the same procedure except that 0.65 g of VSA-S in Production Example 1 was changed to 0.6 g of 2-naphthalene sulfonic acid.

Production Example 3 (General Formula (2)+Vinyl Sulfonic Acid)

A propylene carbonate dispersion C of conductive polymer with a non-volatile content of 1.3% by mass was obtained by the same procedure except that 0.9 g of OFBA (phthalaldehyde acid) in Production Example 1 was changed to 1.8 g.

2. Manufacture of Conductive Polymer Compositions of Examples and Comparative Examples The conductive polymer compositions of Examples and Comparative Examples were manufactured by the following methods. The outline of the conductive polymer compositions is shown in Table 1.

TABLE 1

| | | | Example | | | | | Comparative Example | | | | | |
|---|---|---|---|---|---|---|---|---|---|---|---|---|---|
| | | | 1 | 2 | 3 | 4 | 5 | 1 | 2 | 3 | 4 | 5 | 6 |
| composition | π-conjugated polymer | general formula (1) | ○ | ○ | ○ | ○ | | | ○ | ○ | ○ | ○ | ○ |
| | | general formula (2) | | | | | ○ | | | | | | |
| | | PEDOT | | | | | | ○ | | | | | |
| | dopant | vinyl sulfonic acid | ○ | | ○ | | ○ | | | | | | |
| | | naphthalene sulfonic acid | | ○ | | ○ | | | ○ | ○ | ○ | ○ | ○ |
| | | PSS | | | | | | ○ | | | | | |
| | additive | a plurality of vinyl sulfone groups | | ○ | | ○ | | | | | | | |
| | | polyfunctional thiol | | | ○ | ○ | | | | | | | |
| | | the other vinyl compound | | | | | | | | | ○ | | ○ |
| | | polymer | | | | | | | | | | ○ | |
| | | vinyl sulfonic acid | | | | | | | | | | | ○ |
| evaluation | storage stability of composition | | ○ | ○ | ○ | ○ | ○ | ○ | ○ | X | ○ | X | ○ |
| | moisture and heat resistance in coating film | after 7 days state of coating film | ○ | ○ | ○ | ○ | ○ | X | X | ○ | ○ | X | ○ |
| | | conductivity maintenance rate(%) | 95 | 92 | 95 | 98 | 94 | 0 | 0 | 20 | 15 | 52 | 25 |

TABLE 1-continued

|  |  | Example | | | | | Comparative Example | | | | | |
| --- | --- | --- | --- | --- | --- | --- | --- | --- | --- | --- | --- | --- |
|  |  | 1 | 2 | 3 | 4 | 5 | 1 | 2 | 3 | 4 | 5 | 6 |
| after 12 days | state of coating film | ○ | ○ | ○ | ○ | ○ | — | — | X | ○ | X | X |
|  | conductivity maintenance rate(%) | 88 | 92 | 91 | 95 | 85 | — | — | 0 | 5 | 15 | 0 |
| capacitance appearance rate (%) | | 99 | 95 | 95 | 90 | 98 | 97 | 95 | 52 | 65 | 85 | 95 |

Example 1

The dispersion A was used as the conductive polymer composition of Example 1.

Example 2

To 5 g of the dispersion B, 0.0043 g of VS-C (N,N'-trimethylenebis [2-(vinylsulfonylacetamide)], manufactured by FUJIFILM Corporation) was added as an additive having a plurality of vinyl sulfone groups and the mixture was used as the conductive polymer composition of Example 2.

Example 3

To 5 g of the dispersion A, 0.0043 g of TS-G (1,3,4,6-tetrakis (2-mercaptoethyl) glycoluril, manufactured by SHIKOKU CHEMICALS CORPORATION) was added as a polyfunctional thiol and the mixture was used as the conductive polymer composition of Example 3.

Example 4

To 5 g of the dispersion B, 0.0043 g of VS-C (N,N'-trimethylethylenebis [2-(vinylsulfonylacetamide)], manufactured by FUJIFILM Corporation) was added as an additive having a plurality of vinyl sulfone groups and 0.0040 g of TEMPIC (tris-[(3-mercaptopropionyloxy)-ethyl]-isocyanurate was added as a polyfunctional thiol. The mixture was used as the conductive polymer composition of Example 4.

Example 5

The dispersion C was used as the conductive polymer composition of Example 5.

Comparative Example 1

PT2 (PEDOT/PSS, manufactured by Heraeus Deutshland GmbH & Co. KG) was used as the conductive polymer composition of Comparative Example 1.

Comparative Example 2

The dispersion B was used as the conductive polymer composition of Comparative Example 2.

Comparative Example 3

To 5 g of the dispersion B, 0.0046 g of DVB960 (divinylbenzene, manufactured by NIPPON STEEL & SUMIKIN MATERIALS CO., LTD.) was added as the other vinyl compound and the mixture was used as the conductive polymer composition of Comparative Example 3.

Comparative Example 4

To 5 g of the dispersion B, 0.050 g of a propylene carbonate solution of 10% by mass of a phenylmaleimide-acrylamide copolymer was added as a polymer and the mixture was used as the conductive polymer composition of Comparative Example 4.

Comparative Example 5

To 5 g of the dispersion B, 0.5 g of 1.0 mass % of a 4-styrene sulfonic acid propylene carbonate solution was added as the other vinyl compound and the mixture was used as the conductive polymer composition of Comparative Example 5.

Comparative Example 6

To 5 g of the dispersion B, 0.005 g of VSA-S (vinyl sulfonic acid, manufactured by ASAHI KASEI FINECHEM CO., LTD.) was added as an additive and the mixture was used as the conductive polymer composition of Comparative Example 6.

3. Various Evaluations

The following evaluations were carried out using the conductive polymer compositions of the above Examples and Comparative Examples. The results are shown in Table 1.

The details of each evaluation are as follows.

Storage Stability of Composition

The viscosity of the conductive polymer composition immediately after manufacture and the viscosity of the conductive polymer composition one week after manufacture were measured and evaluated according to the following criteria. The viscosity was measured with a tuning fork type vibration viscometer SV-1A manufactured by A& D Co., Ltd.

O: Change in viscosity is 20% or less.

X: Change in viscosity exceeds 20%.

Moisture and Heat Resistance of Coating Film

Each of the conductive polymer solutions was dropped onto a glass plate and then heat-treated to obtain a 2 cm square coating film having a film thickness of 5 μm. Regarding Comparative Example 1, the heat treatment was carried out under the condition of 105° C. for 30 minutes. Regarding the other Examples and the other Comparative Examples, the heat treatment was carried out under the condition of 150° C. for 30 minutes.

Then, the coating film was left in an environment of 85° C. and 85%, and the state of the coating film after 7 or 12 days was visually observed and evaluated according to the following criteria.

O: No floating or cracking of the coating film was observed.

X: The coating film was floating from the glass plate, or the coating film was cracked.

Further, the conductivity of the coating film was measured before being left in an environment of 85° C. and 85% (before the test) and after being left in an environment of 85° C. and 85% for 7 or 12 days (after the test), and the conductivity maintenance rate was calculated based on the following formula. The conductivity was measured using a resistivity meter (Loresta GP, manufactured by Mitsubishi Chemical Analytech Co., Ltd.).

conductivity maintenance rate (%)=(conductivity after the test/conductivity before the test)×100

Capacity Appearance Rate

A 5 cm² region of the surface-treated tantalum plate was immersed in a 13 mass % disodium adipate aqueous solution, and the capacitance was measured with an LCR meter to calculate the capacitance per 1 cm² (capacitance 1).

Each of conductive polymer solutions was dropped onto the tantalum plate and then heat-treated to obtain a 2 cm square coating film having a film thickness of 1.5 μm. Then a carbon layer and a silver layer were laminated to prepare a silver element. The capacitance was measured with an LCR meter to calculate the capacitance per 1 cm² (capacitance 2).

The capacity appearance rate was calculated by the following formula.

capacity appearance rate (%)=(capacitance 2/capacitance 1)×100

4. Discussion

Example 1 in which vinyl sulfonic acid was used as a dopant was superior in the resistance to moisture and heat in the coating film as compared with Comparative Example 2 in which 2-naphthalene sulfonic acid was used as a dopant. It is considered that the crosslinking with the vinyl group of the vinyl sulfonic acid stabilized the coating film.

Example 2 shows that an additive having a plurality of vinyl sulfone groups can also crosslink with a vinyl sulfone group.

Examples 3 and 4 show that the moisture and heat resistance of the coating film is further improved by adding a polyfunctional thiol which is a Michael addition nucleophile to the vinyl sulfone group.

When a vinyl compound other than the vinyl sulfone group-containing compound was added as in Comparative Example 3, the storage stability of the composition, the moisture and heat resistance of the coating film, and the capacity appearance rate were all not good. Since the tantalum plate used for evaluating the capacity appearance rate has a smooth surface, it is considered the reason why the capacity appearance rate was not good was that the polymer of divinylbenzene added in Comparative Example 3 was not sufficiently dispersed in the conductive polymer and it had a great adverse effect on the conductivity of the conductive polymer.

When a polymer was added as an additive, instead of a monomer, as in Comparative Example 4, neither the conductivity maintenance rate nor the capacity appearance rate was good. It is considered that the reason why the capacity appearance rate was not good was that the polymer added in Comparative Example 4 was not sufficiently dispersed in the conductive polymer and it had a great adverse effect on the conductivity of the conductive polymer.

When a compound having both a sulfone group and a vinyl group but not having a vinyl sulfone group was added as in Comparative Example 5, the storage stability of the composition, and the moisture and heat resistance of the coating film were not good.

When a compound having one vinyl sulfone group was added as an additive as in Comparative Example 6, the moisture and heat resistance of the coating film was not good.

The invention claimed is:

1. A conductive polymer composition comprising a solvent and a π-conjugated conductive polymer
wherein:
the conductive polymer has at least one of the structural units represented by general formula (1) and general formula (2)

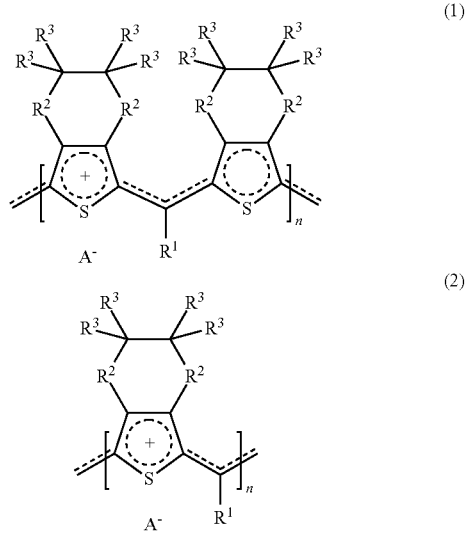

in the general formulas (1) and (2), $R^1$ is an alkyl group having 1 to 12 carbon atoms, an alkoxy group having 1 to 12 carbon atoms, an alkylene oxide group having 1 to 12 carbon atoms, an aromatic group, or a heterocyclic group, each of which optionally has a substituent, each of $R^2$ is an oxygen atom or a sulfur atom, each of $R^3$ is a hydrogen atom, or an alkyl group having 1 to 12 carbon atoms, an alkoxy group having 1 to 12 carbon atoms, or an alkylene oxide group having 1 to 12 carbon atoms, an aromatic group, or a heterocyclic group, each of which optionally has a substituent, $A^-$ is a monoanion derived from a dopant and n is 2 to 300,
a vinyl sulfone group-containing compound containing a vinyl sulfone group is included as a dopant of the conductive polymer or an additive; and
when the conductive polymer composition contains the vinyl sulfone group-containing compound as the additive, the vinyl sulfone group-containing compound contains a plurality of vinyl sulfone groups.

2. The conductive polymer composition of claim 1, wherein the vinyl sulfone group-containing compound is included as the dopant, and the vinyl sulfone group-containing compound is vinyl sulfonic acid.

3. The conductive polymer composition of claim 1, wherein the vinyl sulfone group-containing compound is included as the additive, and the vinyl sulfone group-containing compound is represented by general formula (3),

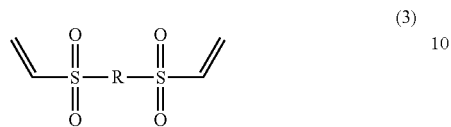

(3)

in the general formula (3), R is an atom or an atomic group, and a main chain of R is composed of one or more atoms selected from a carbon atom, a nitrogen atom, an oxygen atom, and a sulfur atom.

4. The conductive polymer composition of claim 1, wherein the conductive polymer composition includes a polyfunctional thiol.

5. The conductive polymer composition of claim 1, wherein the solvent includes a high boiling point solvent having a boiling point of 140° C. or higher.

* * * * *